(12) United States Patent
Queveau et al.

(10) Patent No.: US 7,121,617 B2
(45) Date of Patent: Oct. 17, 2006

(54) AIR DEFLECTOR DEVICE FOR A VEHICLE HAVING AN OPENING ROOF

(75) Inventors: Paul Queveau, Montravers (FR); Gerard Queveau, Le Pin (FR); Jean-Marc Guillez, Cirieres (FR)

(73) Assignee: Heuliez, (FR)

( * ) Notice: Subject to any disclaimer, the term of this patent is extended or adjusted under 35 U.S.C. 154(b) by 0 days.

(21) Appl. No.: 10/969,290

(22) Filed: Oct. 19, 2004

(65) Prior Publication Data

US 2005/0110306 A1    May 26, 2005

(30) Foreign Application Priority Data

Oct. 20, 2003   (FR) .................................. 03 12248

(51) Int. Cl.
*B60J 7/22* (2006.01)
(52) U.S. Cl. ..................................... 296/217
(58) Field of Classification Search ............... 296/217, 296/220.01
See application file for complete search history.

(56) References Cited

U.S. PATENT DOCUMENTS 5,016,939 A * 5/1991 Nishikawa et al. ......... 296/219
5,601,330 A    2/1997 Ulbrich et al.
6,786,539 B1 * 9/2004 De Gaillard ........... 296/220.01

FOREIGN PATENT DOCUMENTS

| DE | 102 08 909 C1 | 2/2002 |
|----|---|---|
| EP | 0 421 115 A2 | 4/1991 |
| JP | 60169322 | 9/1985 |

\* cited by examiner

*Primary Examiner*—Dennis H. Pedder
(74) *Attorney, Agent, or Firm*—Bachman & LaPointe

(57) ABSTRACT

An air deflector device for a convertible vehicle has a deflector mounted to pivot between a shutting position, in which it participates in making up the roof when the roof is in its closed configuration, and an opening position that it takes up in order to protect the passengers inside the vehicle from the flow of air when the roof is in its retracted configuration. The deflector is mounted to pivot on a carriage which is itself mounted to move along longitudinal guides, it thus being possible for the effectiveness of the deflector to be significantly improved by moving the deflector along the longitudinal direction of the vehicle.

7 Claims, 3 Drawing Sheets

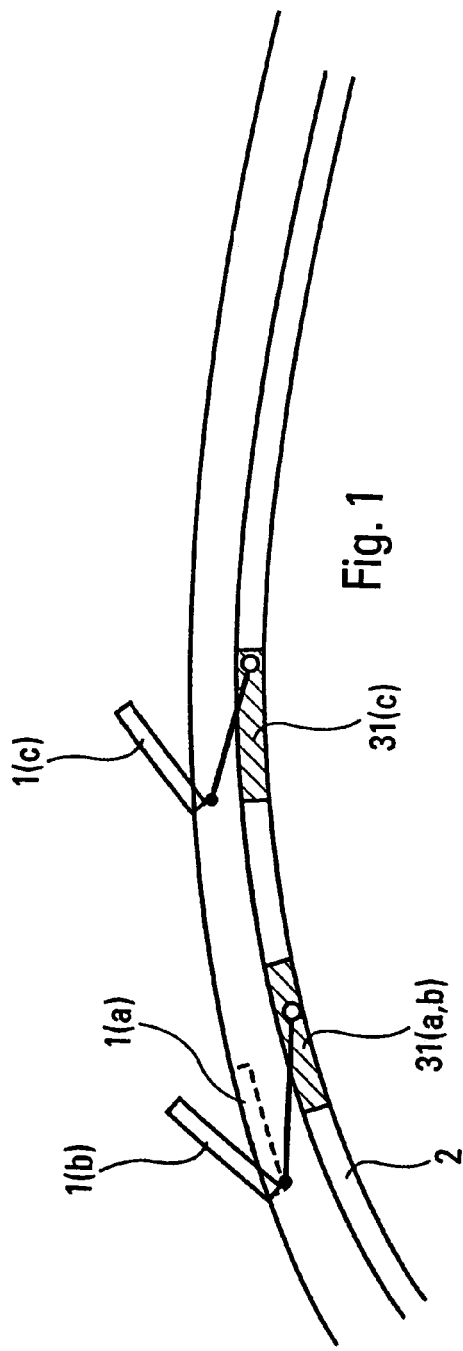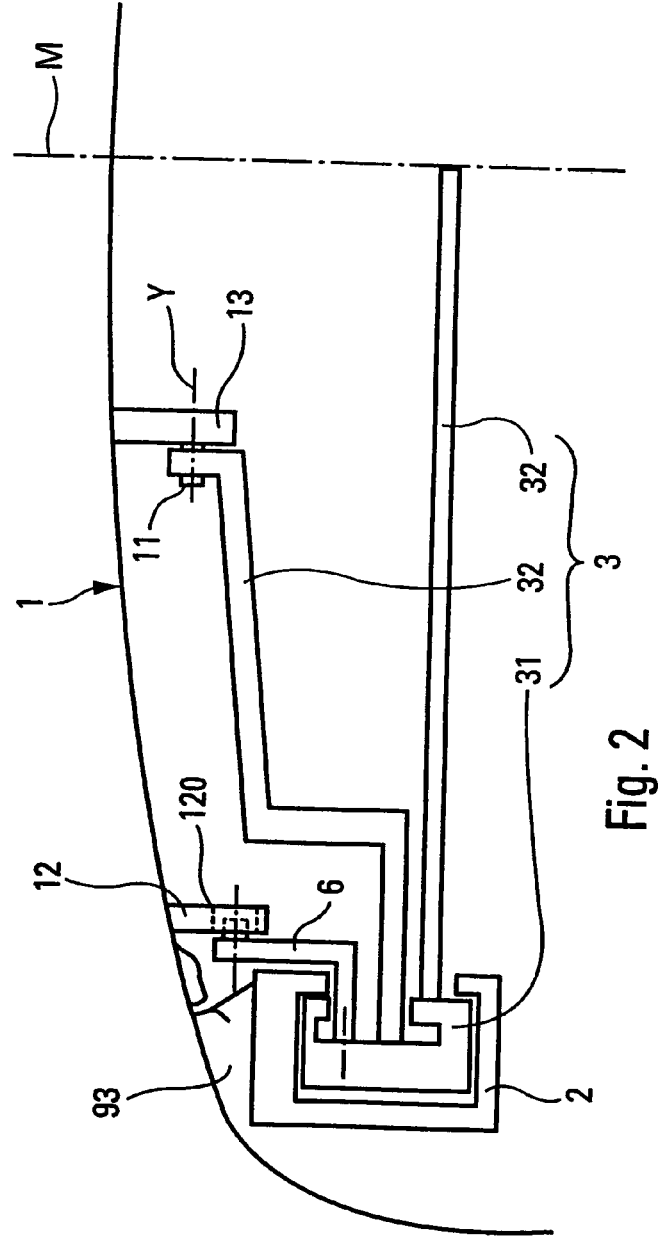

AIR DEFLECTOR DEVICE FOR A VEHICLE HAVING AN OPENING ROOF

BACKGROUND OF THE INVENTION

The invention relates generally to bodywork techniques for vehicles, and in particular for motor vehicles.

More precisely, the invention relates to an air deflector device for a vehicle having a front edge, a rear edge, a longitudinal direction (and/or a midplane), and comprising a windshield, a passenger compartment which is selectively covered by a movable roof comprising at least one roof element that overlies the passenger compartment, when the roof is in a closed configuration, and that is retracted towards the rear of the vehicle, when the roof is in a retracted configuration, said air deflector device comprising:

a deflector disposed between the windshield and the first roof element, said deflector being adapted to take up one of:
  a shutting position, in which it becomes a making up element of the roof when said roof is in its closed configuration,
  and an opening position which it takes up when the roof is in the retracted configuration, said deflector which has a front edge being then inclined upwards and towards the rear edge of the vehicle, by pivoting about a horizontal pivot axis disposed in the vicinity of said front edge of the deflector;
longitudinal guides disposed substantially parallel to the longitudinal direction of the vehicle.

Such a device is known in particular from U.S. Pat. No. 5,601,330.

Often, convertible vehicles having movable or retractable roofs have stationary roof side members and a plurality of moving central roof elements mounted to move from a position in which together they cover the passenger compartment of the vehicle to a substantially vertical or a substantially horizontal retracted position, in which they are folded away in the rear trunk of the vehicle.

It is also known that it is possible to use wind deflectors on vehicles with opening or retractable roofs, which wind deflectors are situated on the rear edge of the aperture crosspiece, and, when the roof is in the retracted position, are deployed so as to deflect the flow of air and so as to increase the comfort of the passengers in terms of exposure to wind.

Unfortunately, when such a vehicle is equipped with a retractable roof or with central roof elements having a plurality of stowage configurations, it is necessary, as a function of the speed of the vehicle, and of the position of the roof elements, which can optionally be mutually superposed, to modify the inclination of the deflector in order to reduce air inrush and turbulence in the passenger compartment of the vehicle.

SUMMARY OF THE INVENTION

In this context, an object of the present invention is to provide an air deflector device which makes it possible to reduce air inrush into the passenger compartment, regardless of the configuration and of the speed of the vehicle, without requiring the inclination of the deflector to be adjusted. The drawbacks of U.S. Pat. No. 5,601,330 are avoided.

To this end, the device of the invention, which otherwise complies with the generic definition given above in the introduction, is, in particular, characterized in that, when the deflector is in the opening position, said deflector takes up a plurality of positions in translation along said longitudinal direction of the vehicle by moving along said longitudinal guides, via a carriage equipped with displacement members and supporting said deflector as it pivots about the horizontal pivot axis, the displacement members linking the carriage to the guides, and selectively making it possible for said carriage, and thus the deflector to be moved longitudinally along the guides.

In the preferred embodiment of the invention, the carriage is provided with right and left arms respectively pivotally receiving right and left pivots of the deflector so that they can pivot about the pivot axis.

For example, the displacement members comprise right and left shoes, respectively guided by the right and left guides, and secured to the right and left arms of the carriage, and the carriage is provided with a link crosspiece interconnecting the right and left shoes.

The device of the invention advantageously further comprises at least one resilient member subjected to variable pre-stress, and urging the deflector to pivot about the pivot axis towards its opening position, and holding members linked to the first roof element and which, when the roof is in the closed configuration, place the deflector in its shutting position and subject the resilient member to its maximum pre-stress.

For example, it is possible to make provision for the deflector to be provided with right and left longitudinal webs disposed vertically respectively on the right of and on the left of the midplane of the vehicle, and carrying respective right and left cams that are symmetrical about the midplane, for each of the cams to define a path having a distal end relatively far from the pivot axis and a proximal end relatively close to the pivot axis, said path coming continuously closer to the pivot axis as it extends from its distal end to its proximal end, and for the device to further comprise link members connecting the cams to the carriage in order to define the position of the deflector.

In an embodiment that is simple and easy to manufacture, the right and left cams are constituted by slots provided in respective ones of the right and left webs of the deflector.

The link members comprise right and left links that are mutually symmetrical about the midplane, each link having a first end hinged to one of the displacement members and a second end guided by one of the cams, in which case, when the deflector is in the shutting position, the holding members bear against the right and left links in a direction tending to hold their respective second ends relatively close to the respective proximal ends of the paths defined by the respective right and left cams.

Instead of having a single resilient member, the device of the invention may advantageously further comprise right and left resilient members, such as spring blades, urging the respective right and left link members in a direction tending to hold the respective second ends of said members relatively far from the respective proximal ends of the paths defined by the respective right and left cams, and tending to place the deflector correspondingly into its opening position. The links inclined relative to the cams participate in holding the deflector in an inclined position ("opening" position), preventing it from pivoting about the axis Y, appropriate calculation of the angle of inclination making it possible for the deflector to return to the retracted position ("shutting" position).

For example, the holding members comprise right and left holding bars secured to the first roof element and suitable for bearing against respective ones of the right and left links when the roof is in the closed configuration.

Finally, the right and left pivots of the deflector may be carried by right and left tabs projecting from the inside face of said deflector, said tabs preferably being closer to the midplane than the right and left longitudinal webs of the deflector.

A vehicle equipped with an air deflector device of the invention is naturally also provided, as is a method of deflecting air by means of the above-presented deflector over a vehicle whose passenger compartment is selectively covered by at least one opening roof element (or front roof element), the method having the feature whereby:

when the roof is closed, the first roof element (front roof element) takes up a substantially horizontal position and the deflector is held in the shutting position; and when the first roof element (front roof element) opens towards the retracted configuration, by moving towards the rear of the vehicle, the deflector pivots about the horizontal axis (Y) until it reaches its opening position and, after it has reached said opening position, it is driven longitudinally in translation towards the rear of the vehicle, until it takes up a position favorable to deflecting the flow of air.

BRIEF DESCRIPTION OF THE DRAWINGS

Other characteristics and advantages of the invention appear clearly from the following description given by way of non-limiting indication and with reference to the accompanying drawings, in which:

FIG. 1 is a diagrammatic side view of a device of the invention, showing the deflector in three different positions, referenced (a), (b), and (c);

FIG. 2 is a fragmentary section view of a device of the invention, the section being taken across the vehicle, and showing the half of the device that is on the left of the midplane M;

DETAILED DESCRIPTION OF THE PREFERRED EMBODIMENTS

As mentioned above, the invention relates to an air deflector device designed to equip a vehicle having a roof which is made up of a plurality of roof elements and which is an opening roof or a retractable roof, i.e. it is suitable for taking up a retracted configuration in which said roof elements are partially or totally retracted towards the rear of the vehicle, e.g. into the rear trunk.

Figure 3:
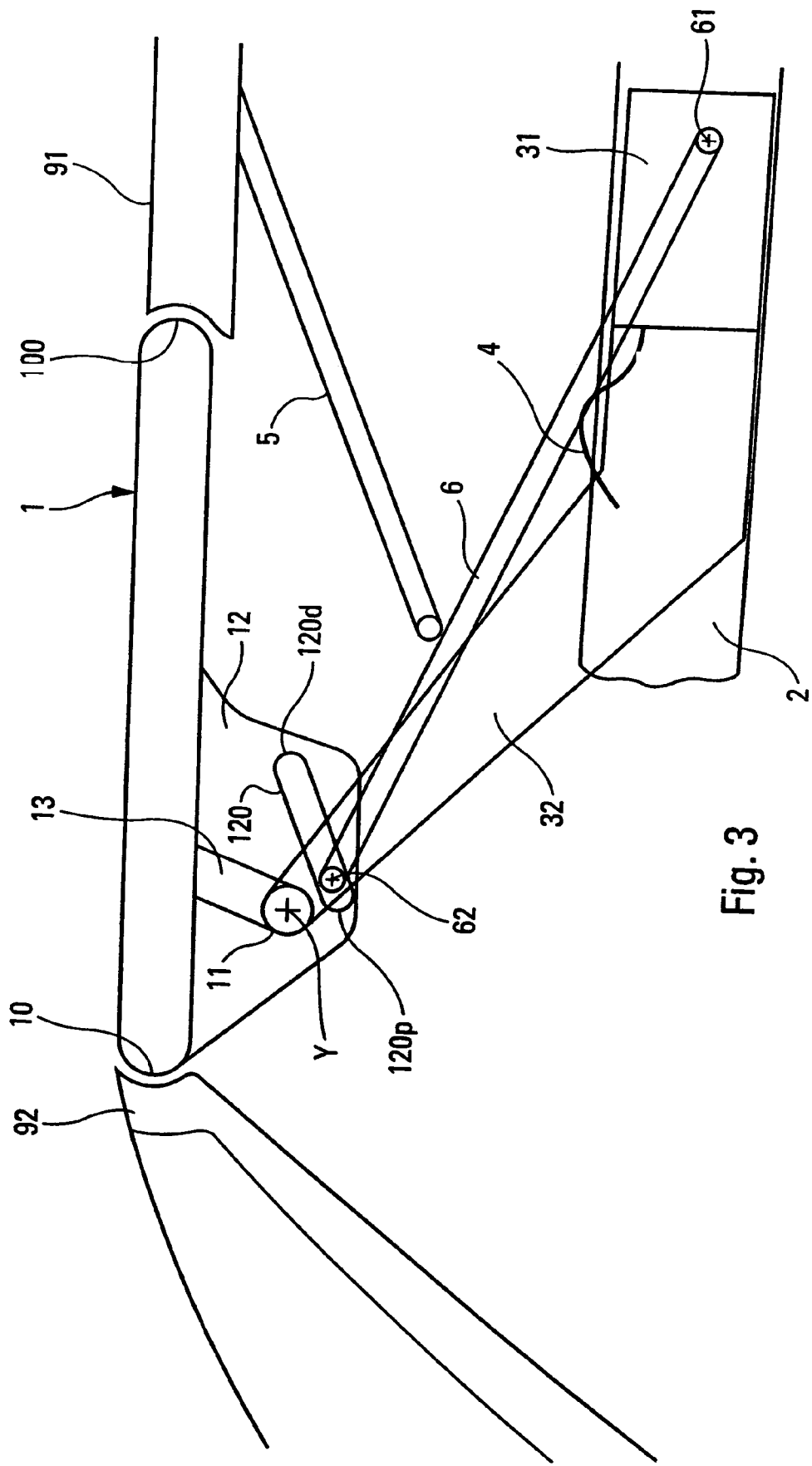
FIG. 3 is a side view of a device of the invention, and of the elements of its surrounding operating environment, said device and said elements being shown with the roof in its closed configuration.

Conversely, when the roof is in its closed configuration, each roof element, in particular the front roof element 91 shown in FIG. 3, overlies the passenger compartment of the vehicle so that said passenger compartment is totally covered.

In known manner, the device of the invention comprises a deflector 1 disposed between a windshield cross member 92 of the vehicle and the front roof element 91, which deflector is suitable for taking up at least a shutting position and an opening position.

In its shutting position, which corresponds to the closed configuration of the roof and which is shown in FIG. 1 by the position (a) and in FIG. 3, the deflector 1 is in a substantially horizontal position, and it participates in making up the roof.

When the roof elements are at least partially retracted, e.g. when the front roof element 91 is superposed on the intermediate roof element (not shown), the deflector 1 (FIG. 1) goes from its substantially horizontal position (a) to an opening position (b) in which it is inclined towards the rear and towards the top of the vehicle by pivoting about a horizontal pivot axis Y (FIG. 4) disposed in the vicinity of the front edge 10 of said deflector 1.

In an essential aspect of the invention, the air deflector device of the invention is designed so that it is possible for said deflector 1, in the opening position, i.e. inclined at an angle that is, for example, constant, to take up a plurality of positions in translation along a longitudinal direction of the vehicle so as to improve air flow deflection, and, in particular to take up the position identified by reference (c) in FIG. 1.

To this end, the device further comprises right and left longitudinal guides 2 disposed symmetrically on the right and on the left of the longitudinal midplane M of the vehicle, and a carriage 3 shown in FIG. 2.

Each guide 2 is secured to the roof side member 93, which member remains stationary when the roof elements are in the retracted position or in the semi-retracted position in the rear trunk of the vehicle.

The carriage 3 is equipped with displacement members 31 and it supports the deflector 1 as it pivots about the pivot axis Y.

The displacement members link the carriage 3 to the guides 2, and make it possible to displace the carriage at will along said guides.

For example, the displacement members are constituted by right and left shoes (or "sliders" or "guide elements") 31 guided by respective ones of the guides 2 on the right and left sides of the vehicle.

The deflector 1 is provided with right and left tabs 13 that project from the inside face of said deflector, and that carry respective right and left pivots 11.

The pivots 11 are pivotally received to pivot about the pivot axis Y in respective ones of right and left arms 32 which are integral parts of the carriage 3 and to which respective ones of the right and left shoes 31 are fixed.

As also shown in FIG. 2, the carriage 3 also includes a link crosspiece 33 which interconnects the right and left shoes 31 directly or via the arms 32, and which makes it possible to displace the carriage 3 along the guides 2.

Projecting from its inside face, the deflector 1 is provided with right and left longitudinal webs 12 disposed vertically respectively on the right and on the left of the midplane M of the vehicle, further away from said plane than the tabs 13.

The right and left longitudinal webs 12 carry respective cams 120, e.g. constituted by slots provided in respective ones of the webs, and mutually symmetrical about the midplane M.

Each of the cams 120 defines a path that comes continuously closer to the pivot axis Y as it extends from its distal end 120$d$, which is relatively far from the axis Y, to its proximal end 120$p$, which is relatively close to said axis.

The device of the invention further comprises link members 6 which connect the cams 120 to the carriage 3 in order to define the open or the shut position of the deflector 1. In the embodiment shown, said link members are in the form of right and left links 6 which are mutually symmetrical about the midplane M.

Each link 6 has a bottom end 61 that is hinged to the corresponding shoe 31, and a top end 62 that is guided by the corresponding cam 120.

The device also comprises holding members 5 linked to the front roof element 91 and, for example, in the form of right and left holding bars 5 secured to said roof element. Said holding members are designed to bear against respective ones of the right and left links 6 when the roof is in the closed configuration, so as to hold the deflector 1 in its shutting position.

For this purpose, the holding bars 5 push the links 6 away in a direction tending to hold their top ends 62 in the vicinities of the proximal ends 120p of the paths defined by the corresponding cams 120, i.e. closer to said ends 120p than to said distal ends 120d.

The force that the holding bars 5 exert opposes a resilient return force exerted by one or more resilient members 4 and that, conversely, urges the links 6 in a direction tending to hold their top ends 62 at a relative distance from said proximal ends 120p of the paths defined the corresponding cams 120, i.e. closer to the distal ends 120d than to the proximal ends 120p.

For example, the resilient members 4 are in the form of right and left spring blades 4 respectively fixed to the corresponding shoes 31, and bearing against the corresponding links 6.

The spring blades, which are thus subjected to variable pre-stress which is at its maximum when the roof is in the closed configuration, continuously urge the deflector 1 to pivot about its pivot axis Y towards its opening position.

The device of the invention operates as follows:

When the roof is closed, the front roof element 91 takes up the substantially horizontal position shown in FIG. 3. In this position, the holding bars 5 with which said roof element is provided push the top ends 62 of the links 6 away downwards against the return force exerted by the spring blades 4, so that the deflector 1 is held in the shutting position, its front edge 10 being in contact with the windshield cross member 92 and its rear edge 100 being in contact with the front edge of the front roof element 91.

Figure 4:
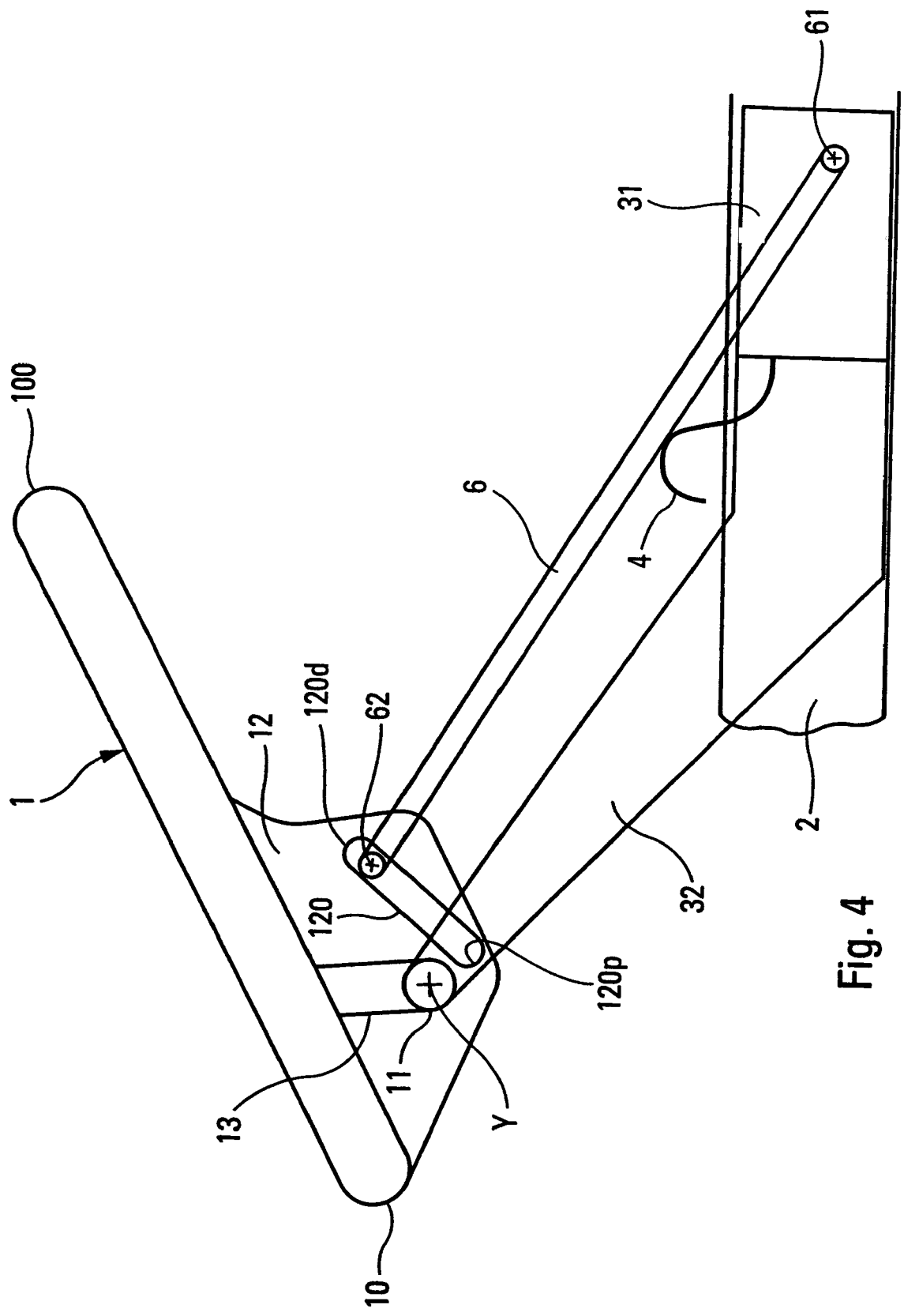
FIG. 4 is a side view of the FIG. 3 device, shown with the roof in its retracted configuration.

When the front roof element 91 is retracted (opens by moving rearwards) into any position, the holding bars 5 release the links 6 which, under drive from the spring blades 4, pivot about their bottom ends 61 and themselves cause the deflector 1 to pivot about the axis Y into its opening position shown in FIG. 4.

After the deflector 1 has reached its opening position, it is possible, by displacing the carriage 3 along the guides 2, to drive the deflector 1 along the longitudinal direction of the vehicle until it takes up a position in which it provides optimum deflection of the flow of air which might otherwise inconvenience the passengers in the vehicle.

Thus, one aspect of the invention relates to a method of deflecting air over a vehicle whose passenger compartment is selectively covered by an opening roof of the above-mentioned type, in which method:

when the roof is closed, the front roof element 91 takes up the substantially horizontal position and the deflector 1 is held in the shutting position (preferably against the above-mentioned return force), so that its front edge is in contact with the aperture crosspiece and its rear edge is in contact with the front edge of the front roof element 91; and when the front roof element opens by moving rearwards, the deflector pivots (preferably naturally) about the axis Y into its opening position and, after it has reached said opening position, it can thus be driven (in this example by displacing its drive and guide means 2, 3) rearwards along the longitudinal direction of the vehicle, until it takes up a position in which it provides said "optimum deflection of the flow of air".

As will be understood by the person skilled in the art on reading the above, it is possible, in addition to the means specifically described, to provide a motor for displacing the deflector along the longitudinal direction of the vehicle, and locking systems for holding the deflector in any one of its positions.

Although the above description is given with bodywork-delimiting side members that are stationary (stationary roof side members 93 defining the roof opening longitudinally to the left and to the right, and the zone in which the roof is displaced longitudinally), roof side members that are removable and mounted to move longitudinally along the axis X of the vehicle can be provided in place of the stationary members (in particular roof side members that can be removed from the bodywork or roof side members that can be retracted into the trunk, together with the rigid roof elements).

The invention claimed is:

1. An air deflector device for a vehicle having a front edge, a rear edge, a longitudinal midplane, and comprising a windshield, a windshield cross member, a passenger compartment which is selectively covered by a movable roof comprising at least one roof element that overlies the passenger compartment, when the roof is in a closed configuration, and that is retracted towards the rear of the vehicle, when the roof is in a retracted configuration, said air deflector device comprising:

a deflector disposed between the windshield cross member and the at least one roof element, said deflector comprising first and second pivots, and being adapted to take up one of:

a shutting position, in which said deflector becomes a making up element of the roof when said roof is in said closed configuration; and an opening position which said deflector takes up when the roof is in the retracted configuration, said deflector which has a front edge being then inclined upwards and towards the rear edge of the vehicle, by pivoting about a horizontal pivot axis disposed in the vicinity of said front edge of the deflector; and first and second longitudinal guides disposed symmetrically on a first side and a second side of the longitudinal midplane of the vehicle, a carriage supporting said deflector as the deflector pivots about the horizontal pivot axis and comprising first and second arms respectively pivotally receiving the first and second pivots of the deflector, so that the deflector can pivot about said horizontal pivot axis, and displacement members linking the carriage to the longitudinal guides, and selectively causing said carriage and thus the deflector to move longitudinally along the guides so that when the deflector is in the opening position, said deflector takes up a plurality of translating positions along a longitudinal direction of the vehicle by moving along said longitudinal guides, via the carriage, wherein the displacement members comprise first and second shoes, respectively guided by the first and second longitudinal guides and secured to the respective first and second arms of the carriage, and the carriage comprises a link crosspiece interconnecting the first and second shoes.

2. The air deflector device according to claim 1, wherein said air deflector device further comprises:
- link members connecting a plurality of cams to the carriage in order to define the position of the deflector, said cams including a first cam and a second cam;
- at least one resilient member subjected to variable pre-stress, and urging the deflector to pivot about the horizontal pivot axis towards its opening position, and
- holding members linked to said at least one roof element and which, when the roof is in the closed configuration, place the deflector in its shutting position and subject the resilient member to a maximum pre-stress;
- said deflector further comprises first and second longitudinal webs disposed vertically respectively on the first side and the second side of said midplane of the vehicle, and carrying the first and second cams which are symmetrical about the midplane;
- each of said cams defines a path having a distal end relatively far from the horizontal pivot axis and a proximal end relatively close to said horizontal pivot axis, said path coming continuously closer to said horizontal pivot axis as said path extends from the distal end to the proximal end;
- the link members comprise first and second links that are mutually symmetrical about the midplane, each link having a first end hinged to one of the displacement members and a second end guided by one of the cams; and
- when the deflector is in the shutting position, the holding members bear against the first and second links in a direction tending to hold the respective second ends relatively close to the respective proximal ends of paths defined by the respective first and second cams.

3. The air deflector device according to claim 1, wherein:
- the deflector further comprises first and second longitudinal webs disposed vertically respectively on the first side and the second side of said midplane of the vehicle and carrying respective first and second cams that are symmetrical about the midplane;
- each of said cams defining a path having a distal end relatively far from the horizontal pivot axis and a proximal end relatively close to said horizontal pivot axis, said path coming continuously closer to said horizontal pivot axis as said path extends from its distal end to its proximal end, and,
- said air deflector further comprises link members connecting the cams to the carriage, to define the positions of the deflector, and
- first and second resilient members urging the link members in a direction tending to hold the respective ends of said link members relatively far from the respective proximal ends of paths defined by the respective first and second cams, and tending to place the deflector correspondingly into the opening position.

4. The air deflector device according to claim 2, wherein the holding members comprise first and second holding bars secured to the at least one roof element and adapted for bearing against respective ones of the first and second links, when the roof is in the closed configuration.

5. The air deflector device according to claim 2, wherein the first and second cams are defined by slots provided in respective first and second webs of the deflector.

6. The air deflector device according to claim 1, wherein:
- the deflector further comprises first and second longitudinal webs disposed vertically respectively on the first and the second side of said midplane of the vehicle, and carrying respective first and second cams that are symmetrical about the midplane,
- the air deflector device further comprises link members connecting the cams to the carriage in order to define the positions of the deflector, and,
- the deflector is further provided with first and second tabs respectively carrying first and second pivots, said tabs being closer to the midplane than the first and second longitudinal webs of the deflector.

7. A convertible vehicle having a front edge, a rear edge, a longitudinal direction, and comprising:
- a windshield,
- a passenger compartment,
- a movable roof for selectively covering the passenger compartment, said movable roof comprising at least a first retractable roof element that overlies the passenger compartment, both when said first retractable roof element is in a first configuration closing from above said passenger compartment, and when it is partially retracted towards the rear of the vehicle, in a second, partially retracted configuration located rearwardly from the first configuration, said movable roof, and thus said first retractable roof element, being further adapted to be totally retracted behind the passenger compartment in a third fully retracted configurations, and,
- an air deflector device comprising:
- a deflector disposed between the windshield and the first roof element, said deflector being adapted to take up one of:
- a shutting position, in which said deflector becomes a making up element of the roof when said roof is in the closed configuration, and
- an opening position which said deflector takes up when the roof is in the retracted configuration, said deflector having a front edge inclined upwards and towards the rear edge of the vehicle, by pivoting about a horizontal pivot axis disposed in the vicinity of a front edge of the deflector;
- longitudinal guides disposed parallel to said longitudinal direction of the vehicle,
- wherein, when the first retractable roof element is in said second partially retracted configuration above said passenger compartment, and the deflector is in the opening position, said deflector takes up a plurality of translating positions along the longitudinal direction of the vehicle by moving along said longitudinal guides, by means of a carriage comprising displacement members and supporting said deflector as said deflector pivots about the horizontal pivot axis, the displacement members linking the carriage to the longitudinal guides, and selectively causing said carriage and thus the deflector to move longitudinally along the guides.

* * * * *